(12) United States Patent
Kaneko

(10) Patent No.: US 9,776,457 B2
(45) Date of Patent: Oct. 3, 2017

(54) TREAD COMPRISING OBLIQUE BLOCKS

(71) Applicants: COMPAGNIE GENERALE DES ESTABLISSEMENTS MICHELIN, Clermont-Ferrand (FR); MICHELIN RECHERCHE ET TECHNIQUE S.A., Granges-Paccot (CH)

(72) Inventor: Shuichi Kaneko, Tokyo (JP)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 457 days.

(21) Appl. No.: 14/367,512

(22) PCT Filed: Dec. 19, 2012

(86) PCT No.: PCT/EP2012/076115
§ 371 (c)(1),
(2) Date: Jun. 20, 2014

(87) PCT Pub. No.: WO2013/092688
PCT Pub. Date: Jun. 27, 2013

(65) Prior Publication Data
US 2015/0183272 A1    Jul. 2, 2015

(30) Foreign Application Priority Data

Dec. 22, 2011  (FR) ..................................... 11 62261

(51) Int. Cl.
*B60C 11/00* (2006.01)
*B60C 11/11* (2006.01)
(Continued)

(52) U.S. Cl.
CPC ........... *B60C 11/0302* (2013.01); *B60C 11/11* (2013.01); *B60C 11/1263* (2013.01);
(Continued)

(58) Field of Classification Search
CPC ............. B60C 11/0302; B60C 11/1346; B60C 2011/0025; B60C 2011/0334
See application file for complete search history.

(56) References Cited

U.S. PATENT DOCUMENTS

| | | | |
|---|---|---|---|
| 5,198,047 A * | 3/1993 | Graas | B60C 11/0302 152/209.18 |
| 2004/0112494 A1* | 6/2004 | Colombo | B60C 11/0302 152/209.18 |
| 2005/0167019 A1* | 8/2005 | Puhala | B60C 11/00 152/209.5 |

FOREIGN PATENT DOCUMENTS

| | | |
|---|---|---|
| DE | 2606703 A1 | 8/1977 |
| JP | 6094805 A | 5/1985 |

(Continued)

OTHER PUBLICATIONS

Machine translation for Japan 2010-047072 (no date).*
(Continued)

*Primary Examiner* — Steven D Maki
(74) *Attorney, Agent, or Firm* — Dickinson Wright, PLLC

(57) ABSTRACT

A tread made of rubber-like material for a tire for winter travel having a plurality of blocks of a height H, each block comprising a contact face designed to come into contact with the ground when the tire travels and at least one lateral face, said lateral face being covered by a layer of covering material over at least 50% of the surface thereof, and a leading zone designed to come into contact first with the ground when the tire travels, and said block has an oblique direction of extension (J) such that the leading zone of said block is a leading corner, and a part which is not covered by (Continued)

the covering material, said covering material having a modulus of elasticity which is greater than the modulus of elasticity of the rubber-like material forming the block, said uncovered part extending from the leading corner over at least ⅓ of the height H of the block.

5 Claims, 3 Drawing Sheets

(51) Int. Cl.
    *B60C 11/12*           (2006.01)
    *B60C 11/03*           (2006.01)
    *B60C 11/13*           (2006.01)
    *B60C 11/14*           (2006.01)

(52) U.S. Cl.
    CPC ... *B60C 11/1346* (2013.01); *B60C 2011/0025* (2013.01); *B60C 2011/0313* (2013.01); *B60C 2011/0334* (2013.01); *B60C 2011/1209* (2013.01); *B60C 2011/145* (2013.01)

(56) References Cited

FOREIGN PATENT DOCUMENTS

| | | | |
|---|---|---|---|
| JP | 60-124507 A | * | 7/1985 |
| JP | 02-249707 A | * | 10/1990 |
| JP | 2246808 A | | 10/1990 |
| JP | 08-318711 A | * | 12/1996 |
| JP | 2001-253209 A | * | 9/2001 |
| JP | 2002-307911 A | * | 10/2002 |
| JP | 2004114994 A | | 4/2004 |
| JP | 2007216829 A | | 8/2007 |
| JP | 2010-047072 A | * | 3/2010 |
| WO | 0143958 A1 | | 6/2001 |

OTHER PUBLICATIONS

Machine translation for Japan 2002-307911 (no date).*
Machine translation fo rJapan 2001-253209 (no date).*
Machine translation for Japan 08-318711 (no date).*
Translation for Japan 02-249707 (no date).*
Machine translation for Japan 60-124507 (no date).*
PCT/EP2012/076115, International Search Report (ISR), Form PCT/ISA/210, dated Apr. 10, 2013 (including English translation), 8 pgs.

* cited by examiner

TREAD COMPRISING OBLIQUE BLOCKS

This application is a 371 national phase entry of PCT/EP2012/076115, filed 19 Dec. 2012, which claims benefit of FR 1162261, filed 22 Dec. 2011, the entire contents of which is incorporated herein by reference for all purposes.

BACKGROUND

Field

The present disclosure relates to a tire tread for winter travel and more particularly a tire tread comprising blocks oriented principally in an oblique direction.

Description of Related Art

To improve the grip of a tire for winter travel, known as a snow tire, on snow-covered ground, it is known to use in the tread a rubber-like material having a low modulus of elasticity. The overall rigidity of the blocks forming said tread is thus reduced and the wear resistance thereof may also be reduced.

In order to improve the rigidity of the blocks whilst maintaining good wear resistance, it is known to configure a tread with inclined blocks forming an angle greater than 0° with an axial direction. In this manner, each block provides a visible projection which plays a greater role in terms of the stresses exerted on said block.

To improve the rigidity of the blocks further it is known to provide the lateral faces of the blocks with a layer of covering material having a modulus of elasticity greater than the modulus of elasticity of the rubber-like material. However, the use of such a covering material may result in an increase in the noise generated due to the impact of said material on the road surface when the tire is travelling.

Thus there is a need to optimize the compromise between the grip on snow-covered ground of a snow tire and the noise generated by said tire when it is travelling.

DEFINITIONS

"Tire" is understood as any type of elastic tire whether it is subjected to an internal pressure or not.

"Snow tire" or "winter tire" is understood as a tire identified by the letters M+S or M.S or even M&S, marked on at least one of the sidewalls of the tire. Said snow tire is characterized by a design of the tread and a rubber composition which is primarily designed to provide, in mud and fresh or melting snow, improved behaviour than that of a road type tire designed to travel on ground which is not covered with snow.

"Tread" of a tire is understood as a quantity of rubber material defined by lateral surfaces and by two principal surfaces, one thereof being designed to come into contact with a road surface when the tire is travelling.

"Rolling surface" is understood as the surface formed by the points of the tread of the tire which come into contact with the road surface when the tire is travelling.

"Block" is understood as relief elements defined by cut-outs, i.e. grooves and/or sipes.

"Corner" forming part of the contact surface of a block is understood as a section delimited by two sides of the contact surface of the block. Said two sides intersect to form an angled portion. Said angled portion may be pointed, rounded, bevelled or the like.

"Groove" is understood as a cut-out, the material faces thereof not coming into contact in normal travelling conditions. Generally, the width of a groove is greater than or equal to 2 mm.

"Sipe" is understood as a cut-out, the material faces thereof coming into contact during normal travelling conditions. Generally, the width of a sipe is less than 2 mm.

"Modulus of elasticity" of an elastic material is understood as the relationship between the variation in stress and the variation in deformation when said material is subjected to tractive or compressive forces.

"Radial direction" is understood as a direction which is perpendicular to the axis of rotation of the tire (said direction corresponds to the direction of the thickness of the tread).

"Axial direction" is understood as a direction parallel to the axis of rotation of the tire.

"Circumferential direction" is understood as a direction which is tangential to any circle centred on the axis of rotation. Said direction is perpendicular both to the axial direction and to the radial direction.

"Oblique direction" is understood as a direction which has both a non-zero axial component and a non-zero circumferential component.

SUMMARY

The invention, in an embodiment, relates to a tread made of rubber-like material for a tire for winter travel, said tread comprising a plurality of blocks of a height H, each block comprising a contact face designed to come into contact with the ground when the tire travels and at least one lateral face, said lateral face being covered by a layer of covering material over at least 50% of the surface thereof. The block comprises a leading zone designed to come into contact first with the ground when the tire travels, the block having an oblique direction of extension such that the leading zone of said block is a leading corner. The lateral face of the block comprises a part which is not covered by the covering material, said covering material having a modulus of elasticity which is greater than the modulus of elasticity of the rubber-like material forming the block, said uncovered part extending from the leading corner over at least ⅓ of the height of the block.

In the first instance, the block of the tread comes into contact with the ground in the region of the leading corner. The conditions in which said contact takes place determine the level of noise when the tire travels.

The invention, in an embodiment, proposes that covering material is not placed in the region of the leading corner of the contact face. In this manner, the block remains sufficiently elastic in the region of said corner to limit the level of noise generated by repeated contact with the ground. Moreover, as the lateral faces of the block are covered on at least 50% of the surface thereof by the covering material, the overall rigidity of the block is maintained which guarantees good grip of the tire on snow-covered ground.

In a variant, the sipe extends over the contact face of the block from the leading corner.

The sipe makes it possible to provide further flexibility to the leading corner of the contact surface. Thus, the noise associated with the contact of said corner with the ground is reduced even further.

In a variant, the sipe has a variable depth in the block, the depth of said sipe increasing, the greater the distance of the sipe from the leading corner.

By providing a variable depth to the sipe, a certain rigidity of the block is maintained in the vicinity of the leading corner. Thus, too much damage to said block is avoided in the region of said corner as a result of repeated contact with the ground.

In a preferred embodiment, the covering layer comprises an elastomeric material of which the dynamic shear modulus G* subjected to a maximum alternating stress of 0.7 MPa, at a frequency of 10 Hz and at a temperature of −10° C., is greater than 200 MPa and preferably greater than 300 MPa.

BRIEF DESCRIPTION OF THE DRAWINGS

Further features and advantages of embodiments of the invention will emerge from the following description, given by way of non-limiting example, with reference to the accompanying drawings, in which.

DETAILED DESCRIPTION OF SPECIFIC EMBODIMENTS

Figure 1:
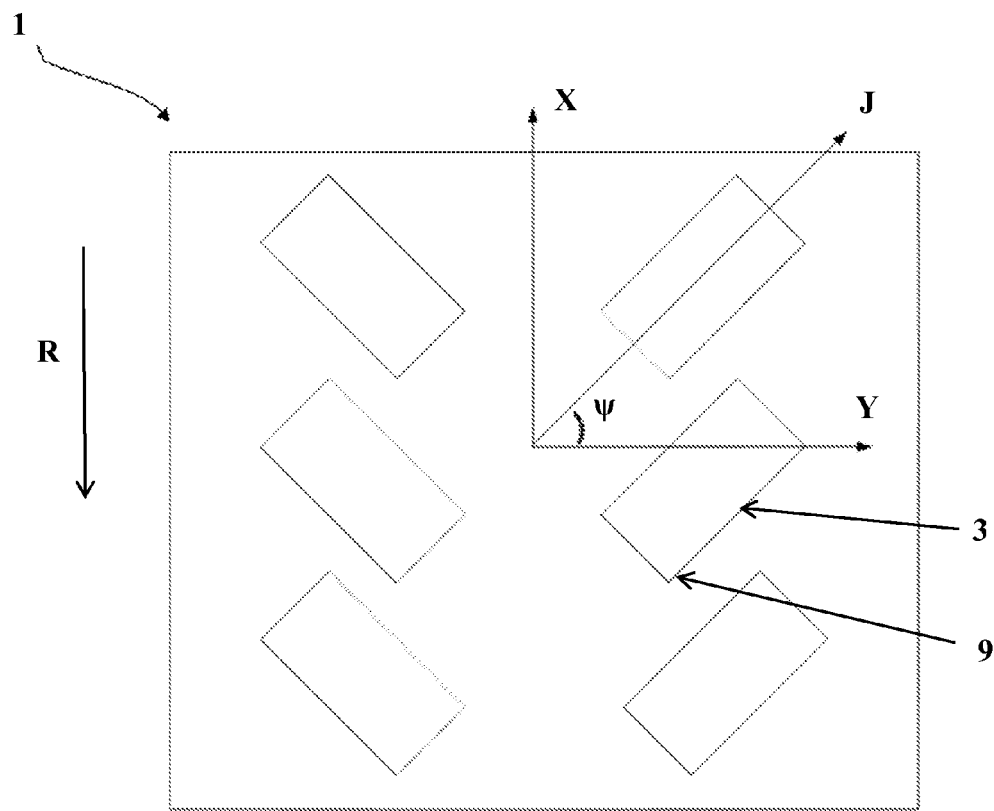
FIG. 1 shows schematically a partial view of a tire tread according to embodiments of the invention.

Elements which are substantially identical or similar will be denoted by identical reference numerals in the following description.

FIG. 1 shows schematically a partial view of a tread 1 according to embodiments of the invention. Said tread comprises a plurality of blocks 3 in relief. The blocks 3 are in this case generally parallelepipedal and principally extend in an oblique direction of extension J. Said direction of extension J forms a non-zero angle relative to a circumferential direction X and relative to an axial direction Y (angle Ψ). The block 3 comprises a leading zone 9 which is the part of the block which first enters into contact with the ground when the tire travels in the direction of travel R (in this case, the direction opposing the direction X). Said leading zone 9 forms a leading corner at this point.

Figure 2:
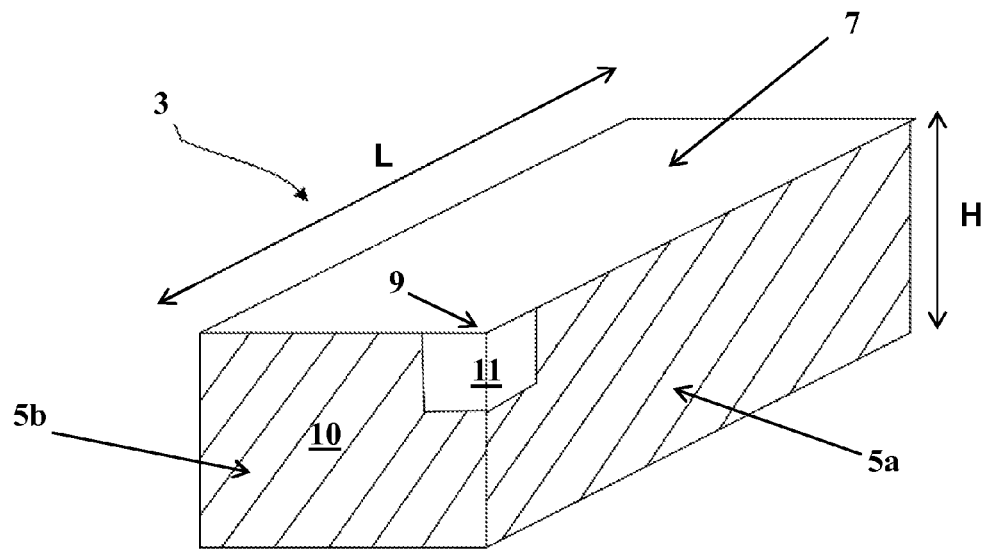
FIG. 2 shows a perspective view of a block forming part of the tread of FIG. 1, according to a first embodiment of the invention.

FIG. 2 is a perspective view of a block 3 of FIG. 1 according to a first embodiment of the invention. Said block 3 has a height H and a length L. More particularly, the block 3 comprises lateral faces 5a, 5b and a contact face 7 connecting said lateral faces 5a, 5b. Longitudinal faces 5a and transverse faces 5b may be seen within said lateral faces, in this case said transverse faces being perpendicular to the longitudinal faces 5a. The longitudinal faces 5a principally extend along the length of the block 3, i.e. in an oblique direction J.

Each lateral face 5a, 5b is covered by a layer 9 of a covering material over at least 50% of the surface of the face. The covering material has good characteristics of rigidity, i.e. a good capacity to resist elastic deformation under the forces of compression and/or shear.

More particularly, the covering material has a modulus of elasticity which is greater than the modulus of elasticity of the rubber-like material forming the block 3. Such a covering material is, for example, an elastomeric material of which the dynamic shear modulus G* subjected to a maximum alternating stress of 0.7 MPa, at a frequency of 10 Hz and at a temperature of −10° C., is greater than 200 MPa and preferably greater than 300 MPa. In the present document, the terms "modulus of elasticity G'" and "modulus of viscosity G''" denote the dynamic properties well known to the person skilled in the art. Said properties are measured on a Metravib VA4000 viscoanalyser on test specimens moulded from raw compositions. Test specimens such as those described in the ASTM D 5992-96 standard (version published September 2006, initially approved in 1996) in the figure X2.1 (circular embodiment) are used. The diameter of the test specimen is 10 mm (thus it has a circular section of 78.5 mm$^2$), the thickness of each of the portions of rubber-like composition is 2 mm, which provides a "diameter to thickness" ratio of 5 (in contrast to the ISO 2856 standard, cited in the ASTM standard, paragraph X2.4 which recommends a d/t value of 2). The response of a test specimen of a vulcanized rubber-like composition subjected to simple alternating sinusoidal shear stress, at a frequency of 10 Hz, is recorded. The test specimen is subjected to sinusoidal shear stress at 10 Hz, at controlled stress (0.7 MPa) symmetrically around its position of equilibrium. The measurement is carried out during a temperature ramp increasing by 1.5° C. per minute, from a temperature Tmin lower than the glass transition temperature (Tg) of the material, up to a temperature Tmax which may correspond to the rubber plateau of the material. Before starting the scanning, the test specimen is stabilized at the temperature Tmin for 20 minutes to reach a uniform temperature within the test specimen. The result used is the dynamic shear modulus of elasticity (G') and the shear modulus of viscosity (G") at the selected temperatures (in this case 0°, 5° and 20° C.). The "complex modulus" G* is defined as the absolute value of the complex sum of the modulus of elasticity G' and the modulus of viscosity G" $G^*=\sqrt{(G'^2+G''^2)}$.

In a variant, the elastomeric material of the covering layer comprises a composition based on at least one diene elastomer which is very highly laden with sulphur, such as ebonite.

In a further variant, the covering layer comprises an assembly of fibres, for example a three-dimensional assembly of fibres forming a felt. The fibres of said felt may be selected from the group of textile fibres and mineral fibres and a mixture thereof. It is also noteworthy that the fibres of said felt may be selected from textile fibres of natural origin, for example from the group of silk, cotton, bamboo, cellulose, wool fibres and mixtures thereof.

In a further variant, the elastomeric material of the covering layer comprises a composition based on at least one thermoplastic polymer, such as polyethylene terephthalate (PET). Such a polymer may have a Young's modulus of more than 1 GPa.

It is also noteworthy that the block 3 comprises a part 11 which is not covered by the covering material. Said part 11 extends over the lateral faces 5a, 5b of the block surrounding the leading corner 9.

Figure 3:
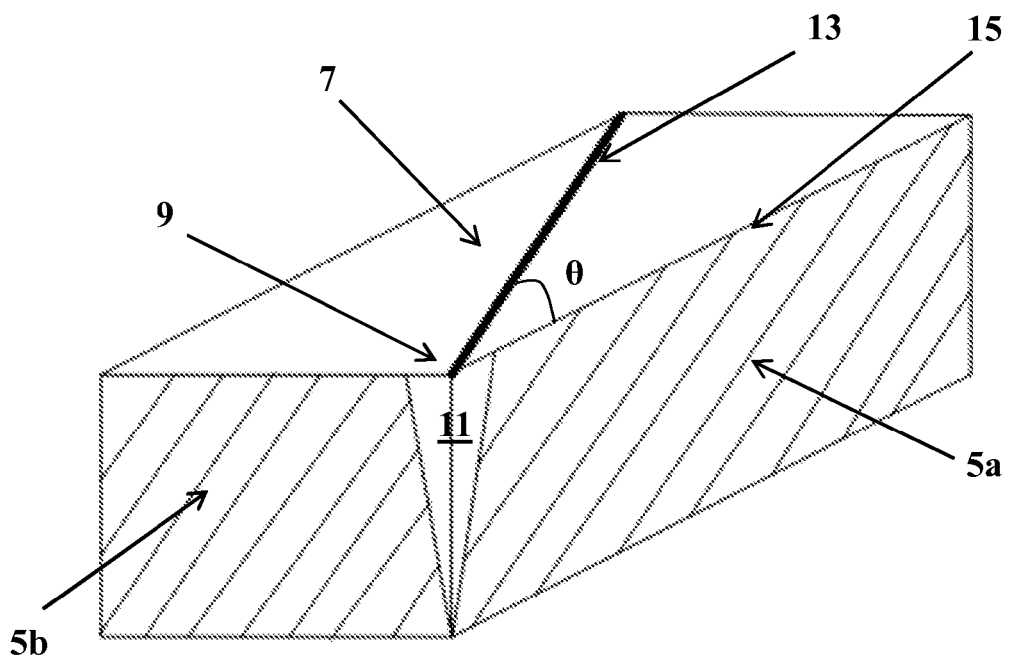
FIG. 3 shows a perspective view of a block forming part of the tread of FIG. 1, according to a second embodiment of the invention.

FIG. 3 shows a variant in which the uncovered part 11 of the block is formed by two triangles. Said triangles extend respectively over the lateral faces 5a, 5b of the block surrounding the leading corner 9.

In the embodiment of FIG. 3, the block 3 also comprises a sipe 13 extending over the contact face 7 of the block from the leading corner 9. Said sipe forms an angle θ with a longitudinal edge 15. Said edge 15 is formed where the contact face 7 meets a longitudinal face 5a of the block. The angle θ is in this case between 30° and 60°.

Figure 4:
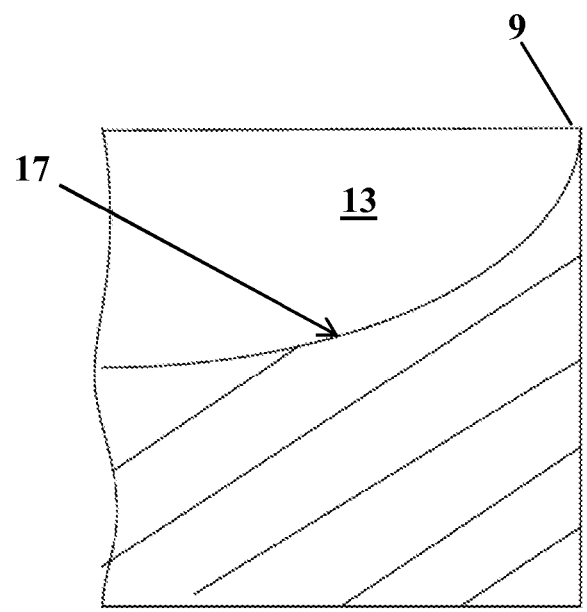
FIG. 4 shows a sectional view of the block of FIG. 3 along the length of a sipe which extends into the block.

As a variant, the depth of said sipe 13 in the block is variable. By way of example, said depth increases, the greater the distance from the leading corner 9. FIG. 4 illustrates such a variant. More particularly, FIG. 4 illustrates a variant in which the depth of the sipe follows a regular progression along a curve 17.

Figure 5:
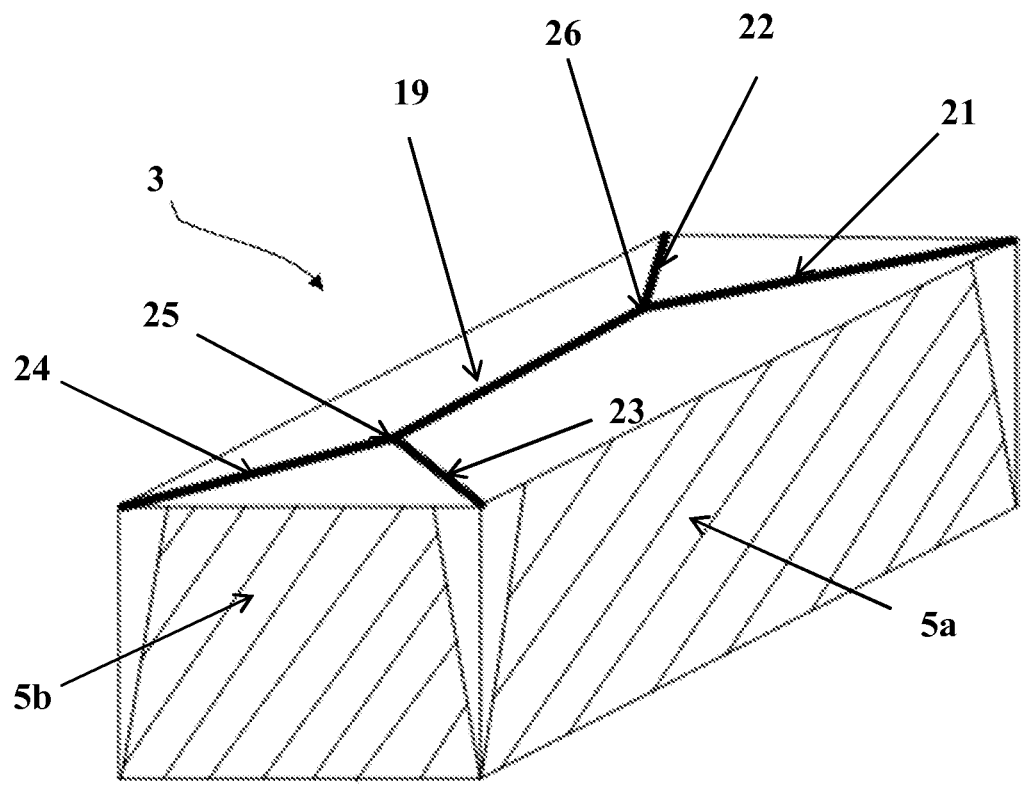
FIG. 5 shows a perspective view of a block forming part of the tread of FIG. 1, according to a third embodiment of the invention.

FIG. 5 shows a third embodiment in which the block 3 comprises a principal sipe 19 and four secondary sipes 21, 22, 23, 24 respectively extending from four corners of the block 3. The principal sipe 19 extends partially along the length of the block 3, over at least 60% of the length of said block 3, said principal sipe thus comprising two ends 25, 26. Each end 25, 26 of the principal sipe is connected to two secondary sipes 21, 22, 23, 24. It is noteworthy here that in the example of FIG. 5 each lateral face 5a, 5b of the block 3 comprises one or more parts not covered by the covering material.

The invention is not limited to the examples described and shown and various modifications may be applied thereto without departing from the scope of the invention.

The invention claimed is:

1. A tread made of rubber-like material for a tire for winter travel, comprising:
a plurality of blocks of a height H, each block comprising:
a contact face designed to come into contact with the ground when the tire travels,
at least one lateral face, covered by a layer of covering material over at least 50% of the surface thereof,
a leading zone designed to come into contact first with the ground when the tire travels,
an oblique direction of extension (J) such that the leading zone of said block is a leading corner,
a region on the at least one lateral face extending from the leading zone to a bottom of the block in a height direction has a part which is covered by the covering material and a part which is not covered by the covering material, and
the part which is not covered by the covering material, extending from the leading corner over at least ⅓ of the height H of the block, and
wherein the covering material has a modulus of elasticity which is greater than a modulus of elasticity of the rubber-like material forming the block, said uncovered part.

2. The tread according to claim 1, further comprising:
a sipe extending over the contact face of the block from the leading corner.

3. The tread according to claim 2, wherein the sipe has a variable depth in the block, the depth of said sipe increasing, the greater the distance of the sipe from the leading corner.

4. The tread according to claim 1 wherein the covering layer comprises an elastomeric material of which the dynamic shear modulus G* subjected to a maximum alternating stress of 0.7 MPa, at a frequency of 10 Hz and at a temperature of −10° C., is greater than 200 MPa.

5. The tread according to claim 4, wherein the dynamic shear modulus G* subjected to a maximum alternating stress of 0.7 MPa, at a frequency of 10 Hz and at a temperature of −10° C., is greater than 300 MPa.

* * * * *